United States Patent [19]
Wakai

[11] Patent Number: 5,749,688
[45] Date of Patent: May 12, 1998

[54] SCREW FIXING PLUG

[75] Inventor: Takao Wakai, Osaka, Japan

[73] Assignee: Wakai & Co., Ltd., Osaka, Japan

[21] Appl. No.: 729,531

[22] Filed: Oct. 11, 1996

[30] Foreign Application Priority Data

Oct. 17, 1995 [JP] Japan ................... 7-268687

[51] Int. Cl.$^6$ ............................................. F16B 13/04
[52] U.S. Cl. ...................... 411/42; 411/55; 411/57
[58] Field of Search ........................ 411/42, 55, 57, 411/59, 71, 72

[56] References Cited

U.S. PATENT DOCUMENTS

| | | | |
|---|---|---|---|
| 1,182,015 | 5/1916 | Kennedy | 411/42 |
| 1,234,177 | 7/1917 | Kennedy | 411/15 |
| 1,934,560 | 11/1933 | Rawlings | 411/15 |
| 4,133,246 | 1/1979 | Small | 411/15 |
| 4,930,963 | 6/1990 | Rockenfeller et al. | 411/44 |
| 5,501,557 | 3/1996 | Wakai | 411/55 |

FOREIGN PATENT DOCUMENTS 6-313413  8/1994  Japan.

Primary Examiner—Steven N. Meyers
Assistant Examiner—Tuyet-Phuong Pham
Attorney, Agent, or Firm—Wenderoth, Lind & Ponack

[57] ABSTRACT

A screw fixing plug which makes it possible for a screw to be fastened in position with its threads biting into the trunk of the plug over the entire length thereof, irrespective of the material of the member to which a screw is fastened is made. The plug has a trunk formed with a screw inserting bore and a composite hole comprising a sector portion and a groove-shaped portion. The trunk has two rib portions defined on both sides of the groove-shaped portion. When a screw is driven into the plug with the plug inserted in a starting hole formed through an article to be fastened and a building material, the portion of the trunk where the composite hole is formed is expanded uniformly. Thus, the threads on the screw will bite the trunk over the entire length thereof irrespective of the kind of building material, so that the screw can be fastened securely.

15 Claims, 3 Drawing Sheets

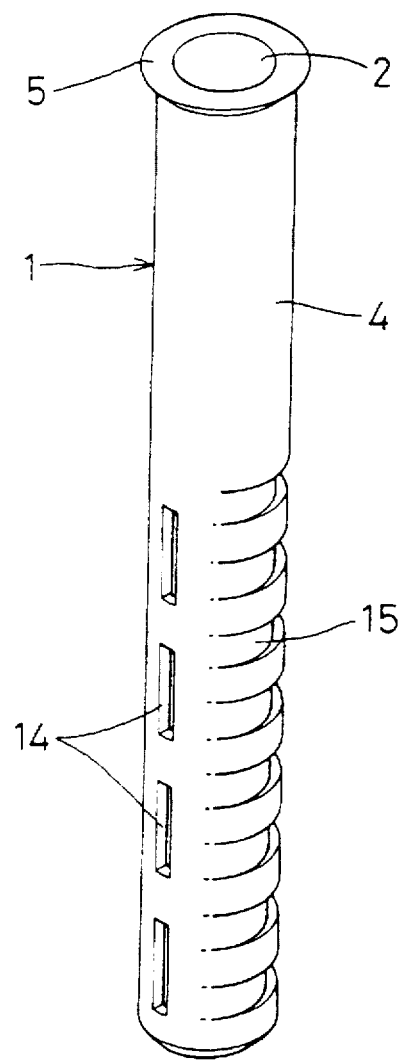
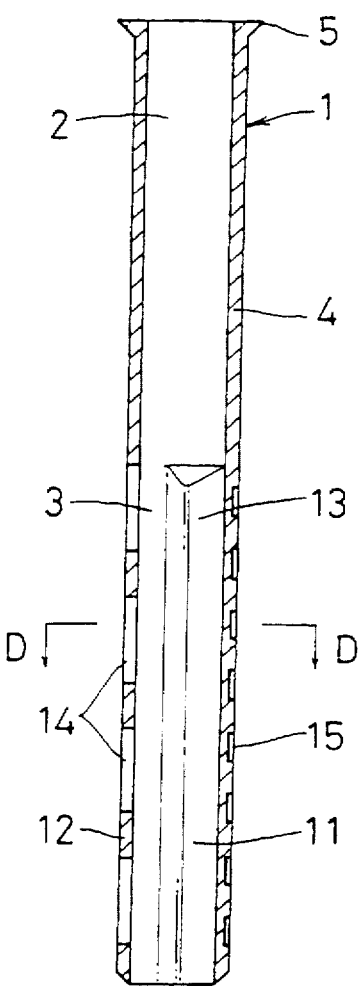
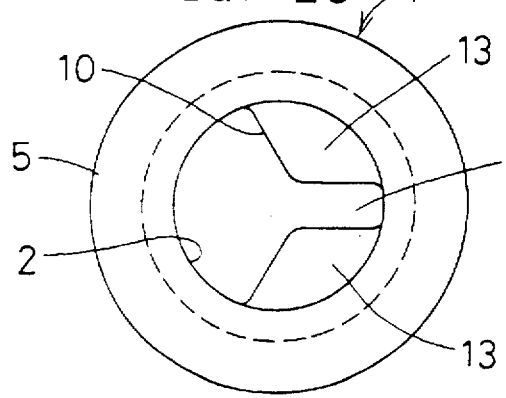
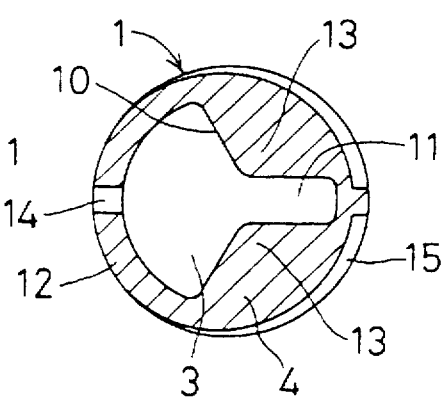

5,749,688

SCREW FIXING PLUG

BACKGROUND OF THE INVENTION

This invention relates to a screw fixing plug used in combination with a screw to fix various articles to a building material such as a concrete block, hollow cement board or siding.

The applicant of this invention proposed in Japanese Patent Application 5-103921 a screw fixing plug which can increase the screw fastening force.

This screw fixing plug includes a cylindrical trunk made of a synthetic resin and having an eccentric bore. A head is provided at one end of the trunk along its outer edge. With the screw fixing plug inserted in a starting hole formed in concrete, a tapping screw is driven into the bore in the plug with e.g. a screw driver. Since the bore is eccentric, the threads on the screw will tear the thin portion of the trunk and bite into the surrounding concrete wall. At the same time, the threads on the screw bite into the thick portion of the trunk, so that the thick portion is pressed hard against the inner surface of the concrete. Since the screw threads bite into both the trunk and the concrete, the article can be fastened securely with the least possibility of the screw slipping.

Since the screw is driven into the eccentric hole, a large force acts on the thick portion of the trunk. If the member into which the screw is driven is a hard member with uniform hardness such as concrete, the screw is driven in with its axis substantially coincident with the axis of the eccentric hole, so that the screw can be driven in reliably with its threads kept in engagement with the thick portion.

However, if the member into which the screw is driven in has hollow portions or is not uniform in hardness, when the screw is driven into the fixing plug and its tip moves into a hollow portion or a soft portion, the screw tip tends to be deflected to the side away from the thick portion until the threads separate from the thick portion. Once the screw tip is deflected, it is difficult to change the screw advancing direction again even after the screw tip has passed the hollow or soft portion. That is, the threads will never bite into the thick portion again, so that it is impossible to fasten the screw strongly.

An object of this invention is to provide a screw fixing plug which makes it possible to reliably fasten a screw to a building material having hollow or soft portions such as a concrete block, hollow cement board or siding.

SUMMARY OF THE INVENTION

According to the invention, there is provided a screw fixing plug comprising a trunk having a screw inserting bore extending axially from one end to a mid-portion thereof, and a composite hole extending axially from the mid-portion toward the other end of the trunk. The trunk has two axial ribs on its inner periphery, and the ribs are defined by the composite hole on both sides thereof.

The trunk is made of a synthetic resin. The composite hole includes a main portion having an arcuate edge, and the trunk has a thin portion defined between the arcuate edge and the outer periphery of the trunk.

Other features and objects of the present invention will become apparent from the following description made with reference to the accompanying drawings, in which:

BRIEF DESCRIPTION OF THE DRAWINGS

FIG. 1A is a perspective view of the screw fixing plug according to this invention;

FIG. 1B is a vertical sectional front view of the screw fixing plug;

FIG. 1C is an enlarged plan view of the screw fixing plug;

FIG. 1D is an enlarged sectional view taken along line D—D of FIG. 1B;

DETAILED DESCRIPTION OF THE PREFERRED EMBODIMENT

Figure 2A:
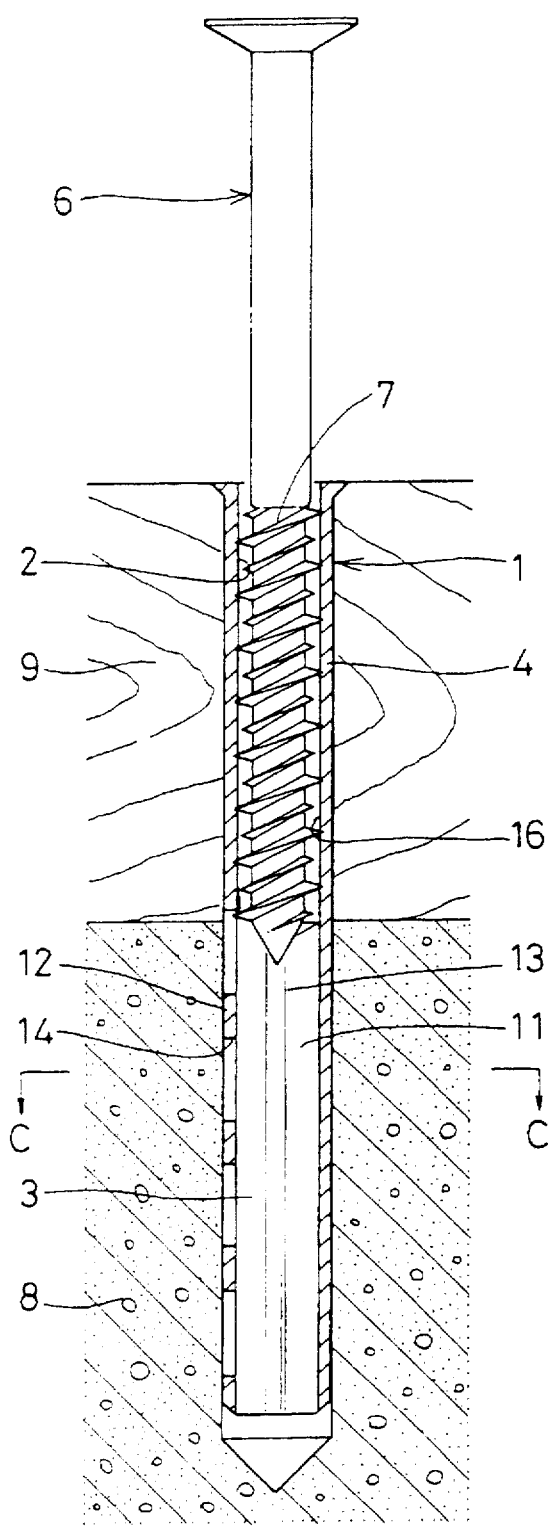
FIG. 2A is a vertical sectional view of the screw fixing plug inserted in a starting hole, and a screw before being fastened.

Embodiments of this invention will now be described with reference to the attached drawings.

As shown, the screw fixing plug 1 comprises a cylindrical trunk 4 made of a synthetic resin or lead and having a screw inserting bore 2 extending from one end thereof to a mid-point, and a composite hole 3 extending from the mid-point to the other end of the trunk 4. A radially outwardly extending head 5 is provided at said one end of the trunk 4.

The trunk 4 has an outer diameter substantially equal to the diameter of threads 7 formed on a screw 6 (FIG. 2) to be used in combination with the plug 1. The screw inserting bore 2 formed in the trunk 4 is a circular hole having a diameter which accounts for 80% of the outer diameter of the trunk 4 and arranged concentrically with the trunk 4.

As shown in FIG. 2A, the overall length of the trunk 4 is determined so that it will extend through an article 9 put on a building material 8 and further into the building material 8 by a length needed to fasten the article 9 to the building material 8. A plurality of such trunks 4 are prepared in different lengths and diameters according to the conditions of different articles 9 and building materials 8. Also, different screws 6 are prepared corresponding to the different kinds of trunks 4.

The screw inserting bore 2 extends axially from one end of the trunk 4 by a length substantially equal to the thickness of the article 9 to be fixed to the building material. The composite hole 3 extends from the inner end of the screw inserting bore 2 to the other end of the trunk 4. It may extend toward the other end of the trunk to a point short of the other end of the trunk.

As shown in FIG. 1D, the composite hole 3 in the first embodiment comprises a sector-shaped portion 10 having its pivot located on the axis of the trunk 4, and a groove-shaped narrow portion 11 extending radially outwardly of the trunk from the pivot of the sector-shaped portion 10. The trunk 4 has a thin portion 12 defined between the arc of the sector-shaped portion 10 and the outer periphery of the trunk, and ribs or thick portions 13 defined on both sides of the groove-shaped portion 11.

The sector-shaped portion 10 has a central angle of about 120 degrees. The groove-shaped portion 11 extends radially outward from the pivot of the sector portion 10 along a line that bisects the central angle of the sector portion 10. An axially continuous or axially discontinuous cut 14 is formed in the thin portion 12 to facilitate radial expansion of the trunk 4. A plurality of grooves 15 are formed in the outer periphery of the trunk 4 at a portion opposite to the cut 14 (FIGS. 1A, 1B).

Figure 3:
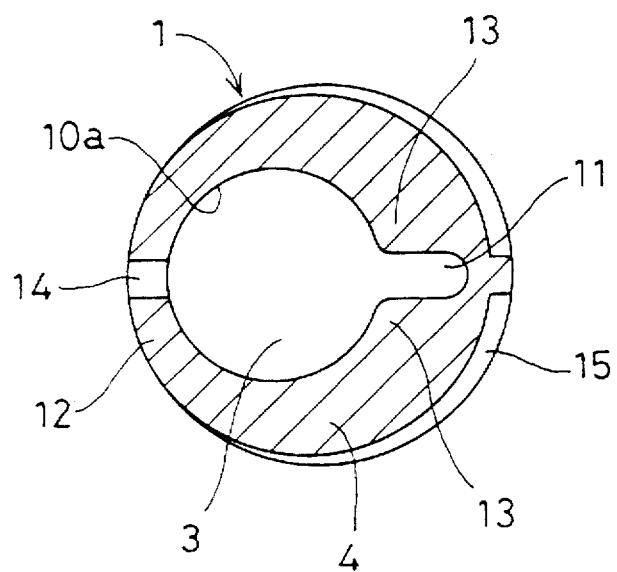
FIG. 3 is a sectional view of another embodiment of a screw fixing plug.

FIG. 3 shows a different example of composite hole 3. It comprises a circular hole 10a eccentric to the trunk 4, and a groove-shaped portion 11 extending from the circular hole 10a in the direction opposite to the direction in which the hole 10a is offset. The ribs or thick portions 13 are defined on both sides of the groove-shaped portion 11. The thin portion 12 is defined between the outer periphery of the trunk 4 and the portion of the circular hole 10 remotest from the groove-shaped portion 11.

In use, in order to fasten the article 9 to the building material 8 such as concrete block, hollow cement board or siding with the screw and the fixing plug of the invention as shown in FIG. 2A, a starting hole 16 having such a diameter and depth as to receive the trunk 4 is formed through the article 9 and the building material 8. The trunk 4 of the screw fixing plug is then inserted into the starting hole 16. Finally, the tapping screw 6 is driven into the screw inserting bore 2 in the trunk 4.

The head 5 prevents the screw fixing plug 1 from dropping completely into the starting hole 16 by abutting the article 9.

Since the screw inserting bore 2 is only slightly smaller in diameter than the threads 7 of the screw 6, the screw 6 can be driven into the screw inserting bore 2 without any major resistance.

When the screw 6 is further driven in, the threads 7 at the tip of the screw 6 will penetrate into the composite hole 3.

As the threads 7 of the screw 6 penetrate into the composite hole 3, the portion of the trunk 4 where the composite hole 3 is formed is expanded. The threads 7 will bite into the inner periphery of the ribs 13 on both sides of the groove-shaped portion 11 of the composite hole 3 while forming female threads thereon. At the same time, the screw 6 is pushed toward the thin portion 12 by the ribs 13, so that the threads 7 tear the thin portion 12 and bite into the inner surface of the starting hole 16 formed in the building material 8, forming female threads thereon.

As the screw is driven into the composite hole 3, the ribs 13, separated by the groove-shaped portion 11 of the composite hole 3, are urged to both sides with an equal force.

Figure 2B:
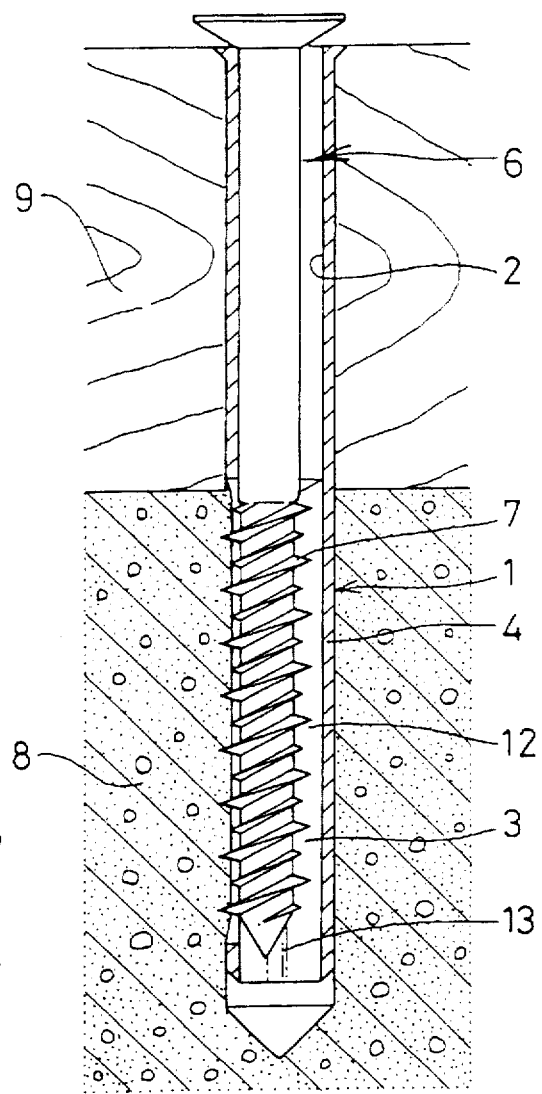
FIG. 2B is a vertical sectional view of the screw fixing plug and screw of FIG. 2A, but; showing a state in which the screw has been fastened.
Figure 2C:
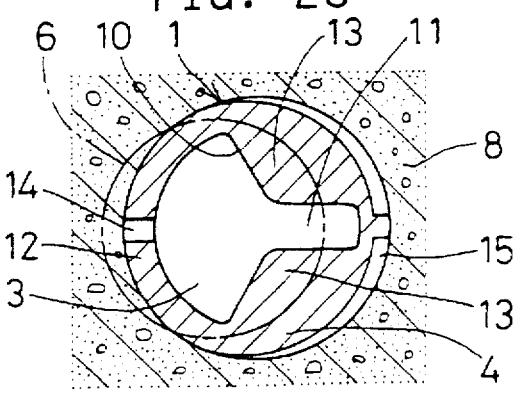
FIG. 2C is an enlarged sectional view taken along line C—C of FIG. 2A.

Even when the screw is driven into the portion of the trunk 4 where the building material 8 has a hollow or soft portion, the trunk is expanded to both sides by substantially the same amount, so that the axis of the trunk 4 displaces little. The screw 6 can thus be driven in reliably over substantially the entire length of the portion of the trunk 4 where there is the composite hole 3 as shown in FIGS. 2B and 2C.

The threads 7 on the screw 6 bite into both the ribs 13 of the trunk 4 and the building material 8, so that the screw 6 is fastened strongly to the building material 8. In this state, the ribs 13, which are also in engagement with the threads 7, serve to resiliently retain the screw 6, preventing slipping of the screw. If a pulling force is applied to the screw 6 after the article 9 has been fastened, the portions of the threads 7 engaging the building material 8 will strongly resist such a force. On the other hand, the portions of the threads 7 engaging the trunk 4 will resiliently absorb vibrations and resist any other long-lasting pulling force. It is thus possible to keep the article 9 fastened to the building material 8 securely for a long time.

As described above, the screw fixing plug according to this invention has a trunk formed with a screw inserting bore and a composite hole. The trunk has two separate ribs defined on both sides of the composite hole. As the screw is driven in, the two ribs are expanded by the screw to both sides by substantially the same amounts. Even if the building material has a hollow portion or a soft portion, the screw will not displace markedly from the axis of the trunk. Thus, the screw threads can bite into the trunk over the entire length thereof, so that the screw can be fastened securely to the building material.

What is claimed is:

1. A screw fixing plug comprising:
   a trunk having first and second axial ends, a screw inserting bore extending axially from said first axial end to an axial mid-portion of said trunk, and a composite hole extending axially from said axial mid-portion toward said second end;
   wherein said trunk includes two inwardly projecting axial ribs on an inner periphery thereof;
   wherein said two axial ribs are located symmetrically about a symmetry point on a circumference of said trunk; and
   wherein said trunk has no inwardly projecting rib at a location on said inner periphery thereof opposite said symmetry point.

2. A screw fixing plug as recited in claim 1, wherein said composite hole includes a main portion having an arcuate edge; and
   said trunk has a thin wall portion, thinner than a thickness of a wall portion of said trunk at said ribs, defined between said arcuate edge of said composite hole and the outer circumference of said trunk.

3. A screw fixing plug as recited in claim 2, wherein said trunk is formed of a synthetic resin.

4. A screw fixing plug as recited in claim 1, wherein said ribs constitute a means for forcing a screw, which is being screwed into said composite hole, toward said thin wall portion of said trunk such that the screw will bite through said thin wall portion of said trunk and into a building material into which said screw fixing plug has been inserted.

5. A screw fixing plug as recited in claim 1, wherein said composite hole includes a sector-shaped main portion, and a groove-shaped narrow portion extending from said main portion and located between said two ribs.

6. A screw fixing plug as recited in claim 1, wherein said trunk has a substantially cylindrical outer periphery; and
   said screw bore is concentric with said substantially cylindrical outer periphery.

7. A screw fixing plug comprising:
   a trunk having first and second axial ends, a screw inserting bore extending axially from said first axial end to an axial mid-portion of said trunk, and a composite hole extending axially from said axial mid-portion toward said second end;
   wherein said trunk includes two inwardly projecting axial ribs on an inner periphery thereof;
   wherein said two axial ribs are located symmetrically about a symmetry point on a circumference of said trunk;
   wherein said composite hole includes a main portion having an arcuate edge, each of said main portion and said arcuate edge being symmetrical about a point circumferentially opposite said symmetry point; and
   wherein said trunk has a thin wall portion, thinner than a thickness of a wall portion of said trunk at said ribs, defined between said arcuate edge of said composite hole and the outer circumference of said trunk at said point circumferentially opposite said symmetry point.

8. A screw fixing plug as recited in claim 7, wherein said trunk is formed of a synthetic resin.

9. A screw fixing plug as recited in claim 7, wherein said ribs constitute a means for forcing a screw, which is being screwed into said composite hole, toward said thin portion of said trunk such that the screw will bite through said thin portion of said trunk and into a building material into which said screw fixing plug has been inserted.

10. A screw fixing plug as recited in claim 7, wherein said main portion of said composite hole is sector-shaped, and said composite hole further has a groove-shaped narrow portion extending from said main portion and located between said two ribs.

11. A screw fixing plug as recited in claim 7, wherein said trunk has a substantially cylindrical outer periphery; and said screw bore is concentric with said substantially cylindrical outer periphery.

12. A screw fixing plug comprising:

a trunk having first and second axial ends, a screw inserting bore extending axially from said first axial end to an axial mid-portion of said trunk, and a composite hole extending axially from said axial mid-portion toward said second end, said composite hole including a main portion having an arcuate edge;

wherein said trunk includes two inwardly projecting axial ribs on an inner periphery thereof;

wherein said two axial ribs are located symmetrically about a symmetry point on a circumference of said trunk;

wherein said trunk has a thin wall portion, thinner than a thickness of a wall portion of said trunk at said ribs, defined between said arcuate edge of said main portion of said composite hole and the outer circumference of said trunk; and wherein said ribs constitute a means for forcing a screw, which is being screwed into said composite hole, toward said thin wall portion of said trunk such that the screw will bite through said thin wall portion of said trunk and into a building material into which said screw fixing plug has been inserted.

13. A screw fixing plug as recited in claim 12, wherein said trunk is formed of a synthetic resin.

14. A screw fixing plug as recited in claim 12, wherein said main portion of said composite hole is sector-shaped, and said composite hole further has a groove-shaped narrow portion extending from said main portion and located between said two ribs.

15. A screw fixing plug as recited in claim 12, wherein said trunk has a substantially cylindrical outer periphery; and said screw bore is concentric with said substantially cylindrical outer periphery.

\* \* \* \* \*